Patented Mar. 28, 1933

1,902,866

UNITED STATES PATENT OFFICE

GEORG KRÄNZLEIN, OF FRANKFORT-ON-THE-MAIN-HOCHST, EWALD DICKHÄUSER, OF GERSTHOFEN NEAR AUGSBURG, AND ARTHUR VOSS, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

ACETALS OF CYCLIC KETONES WITH POLYHYDRIC ALCOHOLS AND PROCESS OF PREPARING THE SAME

No Drawing. Application filed March 3, 1932, Serial No. 596,672, and in Germany March 4, 1931.

This invention relates to new condensation products and to the process of preparing same.

We have found that polyhydric alcohols containing at least 6 carbon atoms and more than two hydroxy groups united with adjacent carbon atoms are capable of reacting with cyclic ketones with formation of condensation products; the properties of these new products are considerably different from those of the parent material. The reaction may be performed in the presence of an acid condensing agent, for instance an acid or an acid reacting substance. A sugar, such as dextrose, a mono-saccharide, a di-saccharide or a poly-saccharide is, for instance, capable of reacting in the said manner with a cyclic ketone. This was unexpected because the sugars mentioned above react only slowly with aliphatic ketones, such as acetone. When a cyclic ketone is used the yield of the condensation product is far superior to that obtainable when an aliphatic ketone is used. The reaction products are obtained directly of a relatively good purity.

Among the polyhydric alcohols of the character described there may be used, besides sugars, other carbohydrates and the derivatives thereof, starch, dextrine, cellulose and the derivatives, hydrogenation products and alkylation products thereof, sorbitol and mannitol. Instead of the polyhydric alcohols there may be used the esters thereof, provided that such working conditions are observed that the corresponding alcohols are intermediately formed. It is pointed out that this method is considered to be an obvious chemical equivalent of that described in the claims and that it is intended to fall within the scope of the claims.

Another method of working consists in that the reaction, when using an alcohol as starting material, is performed in two stages, the first stage consisting in exposing the polyhydric alcohol to the action of a lower alcohol, such as methylalcohol, ethylalcohol and the like in the presence of a sulfuric acid so that a diacetal of the lower alcohol with the ketogroup of the sugar is intermediarily formed; the second stage consists in exposing this acetal in the same medium to the action of the cyclic ketone. This involves the advantage that the reaction is promoted without impairing in any way the properties of the final product.

Among the cyclic ketones there may be used alkylcyclohexanones, halogencyclohexanones, such as ortho-, para or -meta-chlorocyclohexanone or cyclohexanone itself. It is pointed out that the term "methylcyclohexanone" used in the examples and claims means the technical mixture of ortho-, meta and para-methylcyclohexanone.

The temperature may vary within wide limits. However, in order to obtain colorless products, it is desirable to use a temperature between about 0° C. and about 40° C.

The acetal-like compounds obtained are insoluble or only sparingly soluble in water; they are soluble in most of the organic solvents; they are readily soluble in alcohols and esters, but sparingly soluble in aliphatic hydrocarbons. The new products resist chemical actions and raised temperature. If, for instance, the transformation products of sugars with cyclic ketones are heated to about 200° C., no change of color can be observed, contrary to the behaviour of acetone-sugar.

The new condensation products represent acetal-like compounds. Obviously, it is immaterial to the nature of these new compounds whether one or several molecules of the cyclohexanone are combined with the alcohol. Thus, for instance, dextrose, when reacted upon cyclohexanone in the manner described in Example 1, yields a mono- and a di-cyclohexanone-glucose according to the conditions applied. These new compounds correspond to the following probable formula:

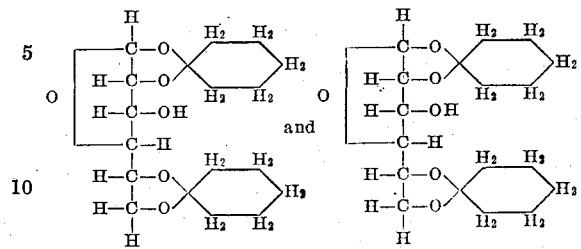

The following examples serve to illustrate the invention, but they are not intended to limit it thereto, the parts being by weight:

1. Upon 500 parts of dextrose there is poured 4 times the quantity of cyclohexanone; 100 parts of sulfuric acid are added to the mixture, while cooling and stirring. After stirring has been continued for 3 hours at ordinary temperature all of the sugar has become dissolved. The viscous solution is mixed with 5 times the quantity of ether and the ethereal solution is washed several times with sodium carbonate and a large quantity of water until the neutral reaction is complete. After drying by means of calcium chloride and evaporation of the ether and the excess of cyclohexanone and after addition of benzine, the syrup rapidly becomes a crystalline magma which is washed with ligroin and filtered by suction. After recrystallization from 6 times the quantity of ligroin the crystallized product is pure and white. It melts without decomposition at 134° C. The elementary composition of the condensation product corresponds with that of a di-cyclohexanone-glucose. The product is readily soluble in alcohols, esters and aromatic hydrocarbons, sparingly soluble in aliphatic hydrocarbons and insoluble in water.

When dissolving the product in hot benzine, there remains the corresponding monocyclohexanone-glucose which melts at 150° C.

2. 50 parts of finely ground cane sugar, 150 parts of methylcyclohexanone and 20 parts of concentrated sulfuric acid are vigorously agitated together during 6 hours. There is formed a viscous yellow syrup which is diluted with 5 times the quantity of alcohol. For neutralization ammonia is introduced; the precipitated ammonium sulfate is separated by filtration and the filtrate is concentrated under reduced pressure. There remains a viscous mass of a light-yellow color which is insoluble in water and readily soluble in the usual organic solvents.

3. 100 parts of mannitol are introduced, while stirring, into 400 parts of cyclohexanone. To this mixture 30 parts of concentrated sulfuric acid are gradually added, while cooling and thoroughly stirring. The mannitol dissolves in the course of 1 hour; after another hour crystals begin to separate. The mass is allowed to stand for 10 hours, an equal quantity of alcohol is then poured thereon and the crystals are filtered by suction. The pure white crystalline mass melts at 89° C. after recrystallization from alcohol.

4. On 100 parts of sorbitol 5 times the quantity of methylcyclohexanone is poured and after the addition of 40 parts of concentrated sulfuric acid, the mixture is agitated at ordinary temperature. After 30 minutes the sorbitol has become dissolved. After agitation has been continued for 4 hours the viscous nearly colorless product is dissolved in ether, and the solution is washed with a solution of sodium carbonate and with water until the neutralization is complete. After drying there are eliminated by distillation first the ether and then the excess of methylcyclohexanone. There remain 210 grams of a resin which is colorless or feebly yellow; it is solid at ordinary temperature and a mobile liquid at 100° C. The resin is insoluble in water and soluble in most of the organic solvents, such as ether, alcohol or benzene.

5. 100 parts of cane sugar are suspended in 100 parts of methylalcohol to which 0.25-0.5 per cent. of concentrated sulfuric acid has been added. The whole is then heated on the water bath and kept boiling in a reflux apparatus until the sugar is dissolved. The limpid solution is cooled and after the addition of 300-400 parts of methylcyclohexanone and 40 parts of concentrated sulfuric acid the whole is agitated for 4 hours at 0°-5° C. The colorless solution is washed with sodium carbonate and water until the neutralization is complete; the excess of methylcyclohexanone is eliminated by distillation. There is obtained a product which is solid, resinous and transparent, like glass, and has a relatively low softening point. The product is soluble in many of the usual organic solvents, such as alcohols, ketones or aromatic hydrocarbons and sparingly soluble in benzine.

6. 100 parts of fructose are agitated at about 30° C.-35° C. together with 300 parts of cyclohexanone and 40 parts of concentrated sulfuric acid. In the course of 1 hour the sediment has become dissolved. A crystalline product soon begins to separate and finally the solution solidifies to form a crystalline magma. The product is separated as completely as possible from the sulfuric acid adhering to it and from the cyclohexanone by filtration with suction. After recrystallization from benzine boiling between 100° C. and 120° C. the substance is analytically pure; it melts at 145° C.

7. 120 parts of dimethoxytrioxyhexane, obtainable by reduction of methyl cellulose, are mixed with 400 parts of para-chlorocyclohexanone and 50 parts of concentrated sulfuric acid, and the mixture is agitated for 4-5 hours at ordinary temperature. The mass is then diluted with benzene, the benzene solution is stirred for several times with water and then dried on sodium carbonate. The filtrate is concentrated and finally the excess of chlorocyclohexanone is eliminated by filtration under reduced pressure. After cooling, there is obtained a clear vitreous residue of a feebly yellow color.

We claim:

1. The process which comprises causing a cyclic ketone to act upon a polyhydric alcohol containing at least 6 carbon atoms and more than two hydroxy groups united with adjacent carbon atoms.

2. The process which comprises causing a cyclic ketone to act upon a polyhydric alcohol containing at least 6 carbon atoms and more than two hydroxy groups united with adjacent carbon atoms in the presence of a condensation catalyst.

3. The process which comprises causing a cyclic ketone to act upon a polyhydric alcohol containing at least 6 carbon atoms and more than two hydroxy groups united with adjacent carbon atoms in the presence of an acid condensation catalyst.

4. The process which comprises causing a cyclic ketone to act upon a polyhydric alcohol containing at least 6 carbon atoms and more than two hydroxy groups united with adjacent carbon atoms in the presence of an acid condensation catalyst and at a temperature between about 0° C. and 40° C.

5. The process which comprises causing a cyclic ketone of the formula

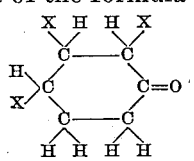

wherein one X represents an alkyl group or a halogen or hydrogen atom and the other X's represent hydrogen to act upon a polyhydric alcohol containing at least 6 carbon atoms and more than two hydroxy groups united with adjacent carbon atoms in the presence of an acid condensation catalyst and at a temperature of between about 0° C. and 40° C.

6. The process which comprises causing a cyclic ketone to act upon a sugar in the presence of an acid condensation catalyst and at a temperature of between about 0° C. and 40° C.

7. The process which comprises causing a cyclic ketone of the formula

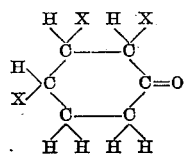

wherein one X represents an alkyl group or a halogen or hydrogen atom and the other X's represent hydrogen to act upon a sugar in the presence of an acid condensation catalyst and at a temperature of between about 0° C. and 40° C.

8. The process which comprises causing methylcyclohexanone to act upon a sugar in the presence of an acid condensation catalyst and at a temperature between about 0° C. and 40° C.

9. The process which comprises subjecting a sugar to the action of a lower alcohol and an acid to form the corresponding acetal and then acting upon the reaction mixture with a cyclic ketone at a temperature between about 0° C. and about 40° C.

10. The process which comprises subjecting cane sugar to the action of methylalcohol in the presence of a small amount of sulfuric acid to form the corresponding methyl-acetal and then acting upon the reaction mixture with methylcyclohexanone at a temperature between about 0° C. and about 40° C.

11. The process which comprises causing methylcyclohexanone to act upon cane sugar in the presence of concentrated sulfuric acid at a temperature between about 0° C. and about 40° C.

12. The process which comprises causing methylcyclohexanone to act upon sorbitol in the presence of concentrated sulfuric acid and at a temperature between about 0° C. and about 40° C.

13. The acetals of cyclic ketones with polyhydric alcohols containing at least 6 carbon atoms and more than two hydroxy groups united with adjacent carbon atoms, these acetals being insoluble or sparingly soluble in water and alphatic hydrocarbons and readily soluble in alcohols and esters.

14. The acetals of cyclic ketones of the formula

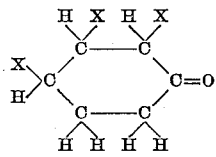

wherein one X represents an alkyl group or a halogen or hydrogen atom and the other X's represent hydrogen with polyhydric alcohols containing at least 6 carbon atoms and more than two hydroxy groups united with adjacent carbon atoms, these acetals being insoluble or sparingly soluble in water and aliphatic hydrocarbons and readily soluble in alcohols and esters.

15. The acetals of cyclic ketones with sugars, these acetals being insoluble or sparingly soluble in water and aliphatic hydrocarbons and readily soluble in alcohols and esters.

16. The acetals of cyclic ketones of the formula

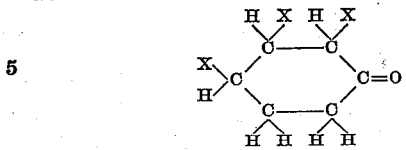

wherein one X represents an alkyl group or a halogen or hydrogen atom and the other X's represent hydrogen with sugars, these acetals being insoluble or sparingly soluble in water and aliphatic hydrocarbons and readily soluble in alcohols and esters.

17. The acetals of methylcyclohexanone with sugars, these products being insoluble or sparingly soluble in water and aliphatic hydrocarbons and readily soluble in alcohols and esters.

18. The acetal of methylcyclohexanone with sorbitol, this product being a colorless or feebly yellow resin, solid at ordinary temperature, and a mobile liquid at 100° C., insoluble in water and soluble in most of the organic solvents.

19. The mass obtainable by the process described in claim 9, being a resin, transparent like glass and having a relatively low softening point.

In testimony whereof, we affix our signatures.

GEORG KRÄNZLEIN.
EWALD DICKHÄUSER.
ARTHUR VOSS.